United States Patent
Willie

[11] Patent Number: 5,864,276
[45] Date of Patent: Jan. 26, 1999

[54] CURRENT TRANSFORMER ASSEMBLIES

[75] Inventor: Christopher Paul Willie, Cheltenham, England

[73] Assignee: Smiths Industries Public Limited Company, London, England

[21] Appl. No.: 908,309

[22] Filed: Aug. 7, 1997

[30] Foreign Application Priority Data

Aug. 29, 1996 [GB] United Kingdom .................... 9618006

[51] Int. Cl.⁶ ............................ H05K 5/02; H05K 27/02
[52] U.S. Cl. .............................. 336/92; 336/174; 336/175
[58] Field of Search ................................ 336/67, 92, 175, 336/174, 173

[56] References Cited

U.S. PATENT DOCUMENTS

| | | | |
|---|---|---|---|
| 3,796,979 | 3/1974 | Hill | 336/67 |
| 4,270,110 | 5/1981 | Martincic et al. | 336/174 |
| 5,337,034 | 8/1994 | Grimes | 336/92 |

FOREIGN PATENT DOCUMENTS

| | | |
|---|---|---|
| 645782 | 3/1995 | European Pat. Off. . |
| 717707 | 11/1954 | United Kingdom . |
| 2113923 | 8/1983 | United Kingdom . |
| 92/17044 | 10/1992 | WIPO . |

Primary Examiner—Michael L. Gellner
Assistant Examiner—Anh Mai
Attorney, Agent, or Firm—Pollock, Vande Sande & Amernick

[57] ABSTRACT

A current transformer assembly has an annular transformer encompassing a busbar where it projects through the wall of equipment. The assembly has an electrically-insulative housing bolted to the equipment wall. The housing has a rear wall with an aperture through which the busbar extends, the transformer being located in a recess between the rear wall of the housing and the front of the equipment wall. The housing is open on its front and has a removable cover plate. The busbar is bolted to the upper surface of a plinth in the housing, which also supports the end of a cable entering through the front wall and bolted to the busbar.

10 Claims, 1 Drawing Sheet

CURRENT TRANSFORMER ASSEMBLIES

BACKGROUND OF THE INVENTION

This invention relates to current transformer assemblies.

Current transformers are often used to monitor current flow in a circuit, such as to detect excessive power consumption and provide a warning signal or disconnect power supply. Current transformers take the form of a toroid having a number of turns of a wire. The central aperture of the transformer is threaded onto the current-carrying conductor and the output current is taken from flying leads attached to the toroid winding. This can create a problem because it is necessary to break the current-carrying conductor when the transformer needs to be replaced.

BRIEF SUMMARY OF THE INVENTION

It is an object of the present invention to provide an improved current transformer assembly.

According to one aspect of the present invention there is provided a current transformer assembly comprising a current transformer coil of annular shape, an electrically-insulative housing, a first conductor projecting from a first wall and through an opening in a rear wall of said housing, said first conductor being terminated in said housing and having a portion exposed for connection to a second conductor, and said transformer coil encompassing said first conductor and being located between the rear wall of said housing and said first wall.

The rear wall of said housing and said first wall preferably define therebetween a recess in which said transformer coil is located. The first conductor may be a rigid bar of rectangular section. The housing preferably has a support surface aligned with the opening, the first conductor being secured with the support surface, such as by means of a bolt. The second conductor may be connected with the first conductor on the support surface, such as by means of a bolt. The housing is preferably secured to the first wall by means of two bolts. The housing may have a removable cover plate and be open on its front wall through which the second conductor extends.

A current transformer assembly according to the present invention will now be described, by way of example, with reference to the accompanying drawings.

DETAILED DESCRIPTION OF THE PREFERRED EMBODIMENT

Figure 1:
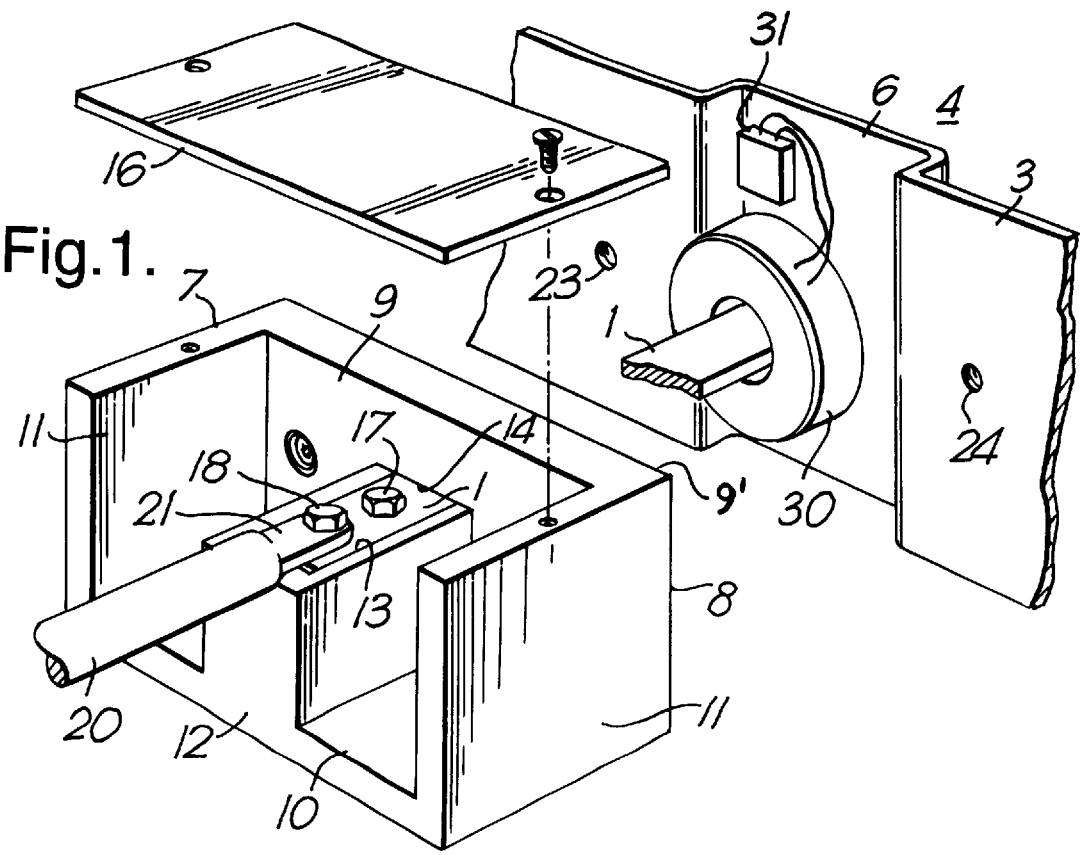
FIG. 1 is an exploded, perspective view of the assembly.
Figure 2:
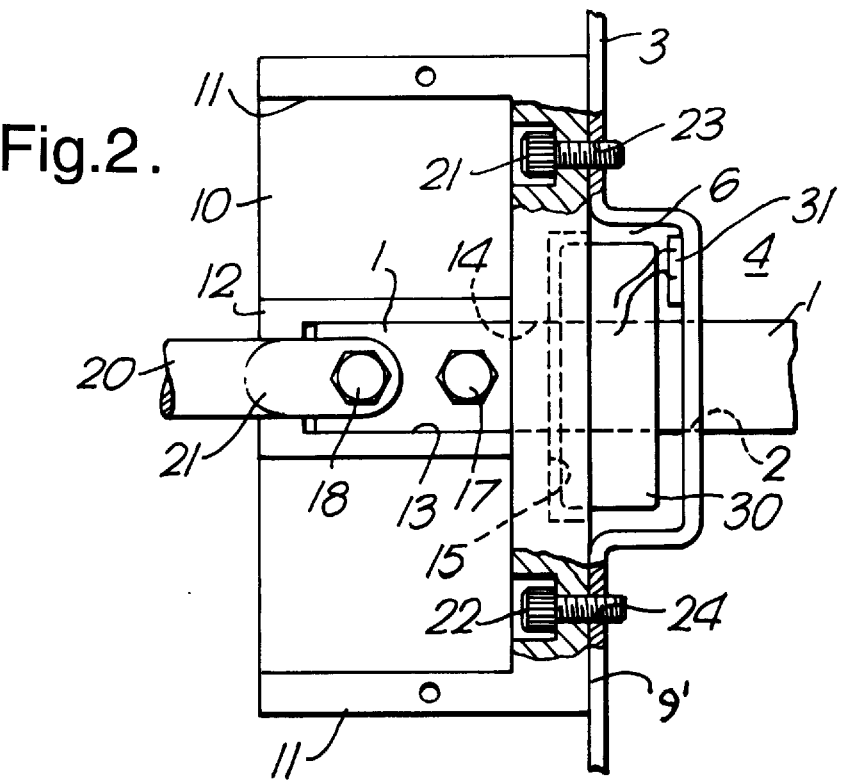
FIG. 2 is a plan view of the assembly.

A current-carrying conductor, or busbar 1, protrudes through an aperture 2 in the wall 3 of equipment, indicated generally by the numeral 4. The wall 3 is stepped back in the region of the aperture 2 to provide a rectangular recess 6. The busbar 1 is a rigid bar of rectangular section and is self-supporting, although the conductor could take the form of a flexible cable instead of a rigid bar.

The assembly also includes a housing 7 of an electrically-insulative material, such as a plastics. The housing 7 is of rectangular shape comprising a lower part 8 having a rear wall 9, a floor 10 and two side walls 11. A plinth 12 stands centrally of the floor 10 and has a shallow groove 13 on its upper surface aligned with a rectangular aperture 14 in the rear wall 9. The external surface or rear face of the rear wall 9 has a circular recess 15 surrounding the aperture 14. The housing 7 is completed by a separate, removable cover plate 16 screwed to the two side walls 11. The front of the housing 7 is open.

The busbar 1 extends though the aperture 14 in the rear wall 9 and lies in the groove 13 on the plinth 12; it is secured in position by means of a bolt 17, which passes through a hole in the bar and is either screwed into a threaded hole in the plinth or is retained by a nut. Electrical connection to the busbar 1 is made by an insulated cable 20. An electrically-exposed ring tag) 21 at the forward end of the cable is clamped directly onto the busbar 1 by a second bolt 18, which screws into a nut (not shown) under the busbar. The housing 7 is supported on the wall 3 of the equipment 4 by two bolts 21 and 22 extending through the rear wall 9 of the housing and into threaded holes 23 and 24 in the wall of the equipment. The housing 7 helps support the projecting end of the busbar 1 against vibration.

The assembly also includes a current transformer coil 30 of circular, annular shape with toroidal windings. The transformer coil 30 encompasses the busbar 1 and is located between the wall 3 of the equipment 4 and the external surface 9' of the rear wall 9 of the housing 7. The transformer coil 30 is located in the recess 6 in the wall, the length of the transformer coil being greater than the depth of the recess so that the forward part of the transformer coil projects into the circular recess 15 on the rear of the housing 7. The combined depth of the two recesses 6 and 15 is slightly greater than the length of the transformer coil 30, so that external surface 9 of the rear wall 9' of the housing 7 contacts the wall 3 of the equipment 4 when the housing is bolted in position. The windings of the transformer coil 30 are connected to an interface connector 31, which is also mounted on the wall 3, in the recess 6. Output current in the transformer coil is supplied to the connector 31.

The assembly has the advantage that the transformer coil 30 is protected between the wall 3 of the equipment 4 and the housing 7. The transformer coil 30 can, however, be easily removed and replaced if necessary by removing the two bolts 17 and 18 secured to the busbar 1, and removing the other bolts 21 and 22 holding the housing 7 on the wall 3. The housing 7 can then be slid forwardly off the busbar 1, enabling the transformer coil 30 to be slid off, together with its connector 31. A new transformer coil can be slid back on the busbar and the housing replaced. The insulative nature of the housing 7 helps protect the connection between the busbar and the cable from inadvertent electrical contact.

What I claim is:

1. A current transformer assembly comprising: a current transformer coil of annular shape; an electrically-insulative housing, said housing having a removable cover plate, an open front wall, a rear wall and an opening in said rear wall; and a first conductor projecting from a first wall and through said opening in said rear wall of said housing, wherein said first conductor extends through said rear wall and is terminated in said housing and has a portion exposed for connection to a second conductor which extends through said open front wall of said housing, and wherein said transformer coil encompasses said first conductor and is located between an external surface of the rear wall of said housing and said first wall.

2. An assembly according to claim 1, wherein the said external surface of said rear wall of said housing and said first wall define therebetween a recess, and wherein said transformer coil is located in said recess.

3. An assembly according to claim 1, wherein said first conductor is a rigid bar of rectangular section.

4. An assembly according to claim 1, wherein said housing has a support surface aligned with said opening, and wherein said assembly includes an attachment device securing said first conductor to said support surface.

5. An assembly according to claim 4, wherein said attachment device is a bolt.

6. An assembly according to claim 4, wherein said assembly includes a connection connecting said second conductor with said first conductor on said support surface.

7. An assembly according to claim 1, including a bolt, connecting said first conductor with said second conductor.

8. An assembly according to claim 1, including a securing device securing said housing to said first wall.

9. An assembly according to claim 8, wherein said securing device is provided by two bolts.

10. A current transformer assembly for mounting on a wall of equipment, said assembly comprising: a current transformer of annular shape; an electrically-insulative housing, said housing having a rear wall, an opening in said rear wall, and a plinth with an upper support surface aligned with said opening, said rear wall of said housing and said wall of said equipment defining therebetween a recess; a busbar projecting from said equipment wall and through said opening in said rear wall of said housing, said busbar being terminated in said housing and having a portion exposed for connection to a second conductor, said busbar and said second conductor being attached with said upper support surface of said plinth, and said transformer having a coil that encompasses said busbar and is located in said recess between an external surface of said rear wall of said housing and said wall of said equipment.

\* \* \* \* \*